United States Patent
Fechner (10) Patent No.: US 7,274,641 B2
(45) Date of Patent: Sep. 25, 2007

(54) REPLAY OR RECORDING APPLIANCE FOR OPTICAL RECORDING MEDIA HAVING AN INCLINATION CONTROL SYSTEM

(75) Inventor: Manfred Fechner, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 502 days.

(21) Appl. No.: 10/827,954

(22) Filed: Apr. 20, 2004

(65) Prior Publication Data

US 2004/0218495 A1    Nov. 4, 2004

(30) Foreign Application Priority Data

Apr. 30, 2003   (DE) ................................. 103 19 757

(51) Int. Cl.
  *G11B 7/00*   (2006.01)
(52) U.S. Cl. ................... 369/53.19; 369/44.32
(58) Field of Classification Search ............ 369/44.42, 369/44.41, 44.32, 47.27, 53.19, 53.12
  See application file for complete search history.

(56) References Cited

U.S. PATENT DOCUMENTS

| | | | |
|---|---|---|---|
| 5,627,808 A | 5/1997 | Hajjar et al. | |
| 6,526,007 B1 | 2/2003 | Fujita | |
| 6,788,627 B2 * | 9/2004 | Aikoh et al. | 369/44.32 |
| 7,133,340 B2 * | 11/2006 | Takeda | 369/53.19 |

FOREIGN PATENT DOCUMENTS

DE          19824056         2/1999

OTHER PUBLICATIONS

Search Report for German Patent Appln. No. 103 19 757.5 dated Aug. 5, 2003.

* cited by examiner

*Primary Examiner*—Nabil Hindi
(74) *Attorney, Agent, or Firm*—Joseph J. Laks; Robert D. Shedd; Reitseng Lin (57) ABSTRACT

The invention relates to a method and an arrangement for a replay or recording appliance for optical recording media having an inclination control system for vertical alignment of the scanning beam with respect to optical recording media. In order to exclude other factors which, in addition to the inclination of the scanning beam, influence the radio-frequency signal which is detected by the recording medium, without any additional inclination sensors from the disadvantageous influence of the inclination control, an inclination control system is provided which uses the lower envelope curve signal of a radio-frequency signal which is detected by the optical recording medium and represents the dark value of the detected radio-frequency signal. The lower envelope curve signal is multiplied upstream of an inclination control system by a modulation signal which is added to the output signal from the inclination controller for vertical alignment of the scanning beam which is directed at the optical recording medium. The envelope curve signal which is, for example, the mirror signal is multiplied by the modulation signal and is integrated or low-pass filtered in order to form a control error, which corresponds to an error between the scanning beam, which is directed at the optical recording medium, and the vertical. The invention is intended to be used for replay or recording appliances for optical recording media with inclination control.

12 Claims, 8 Drawing Sheets

REPLAY OR RECORDING APPLIANCE FOR OPTICAL RECORDING MEDIA HAVING AN INCLINATION CONTROL SYSTEM

FIELD OF THE INVENTION

The invention relates to a method and an arrangement for a replay or recording appliance for optical recording media having an inclination control system which aligns the scanning beam at right angles, at least in one direction, to the optical recording medium, such as a CD, DVD or Blue Disc.

BACKGROUND OF THE INVENTION

Optical recording media, such as CDs, DVDs or Blue Disc, are frequently bent radially outwards, upwards or downwards and can neither be recorded on nor replayed by means of a conventional scanning device which guides the scanning beam exclusively on the track and in the focus direction of the recording medium. This is particularly applicable to recording media which are composed of a number of layers, such as DVDs. Recording media which are curved from the inside to the outside are also referred to as umbrella disks, owing to the curvature. The surface of a disk such as this has an inclination, which is referred to as radial tilt, with respect to a plane, so that it is necessary to tilt the scanning device or the actuator in order to align the scanning beam at right angles to the recording medium, since optimum recording or replay of information is ensured only when the scanning beam is aligned at right angles to the recording medium. Recording medium curvature, which is known in the German language by the expression Plattenschlag [disk impact] and is repeated with each revolution of the recording medium generally leads to both a radial tilt and tangential tilt. An appliance for aligning the scanning beam at right angles to the recording medium by tilting the scanning device is already known from U.S. Pat. No. 5,034,939. In this appliance, the error rate in a data signal which is read from the recording medium is used for alignment at right angles and/or in order to vary the inclination of the scanning beam. A minimum error rate in this case corresponds to optimum tilt correction. Furthermore, a tilt servo circuit is known from U.S. Pat. No. 5,001,690, by means of which the inclination angle of the scanning beam is varied in order to achieve a maximum level of the reproduced information signal or HF signal which is detected from the recording medium. However, the error rate and the level of the HF signal are dependent not only on the tilt but also on numerous other factors, such as scratches, so-called black dots, the depth of the pits, the reflection level of the disk and any focus offset. In particular, scratches and other factors which influence the detected radio-frequency signal in addition to the inclination of the scanning beam, lead, however, to unnecessary correction of the inclination angle, which has a disadvantageous influence on the scanning or recording of information as a result of discrepancies from an alignment at right angles to the recording medium. Furthermore, the direction of the change in the inclination angle is determined only after a previous change to the inclination angle and after the error rate or the HF level has increased or decreased, so that an incorrect direction may be chosen first of all and it is impossible to correct the inclination angle immediately. Furthermore, the central processor unit of the appliance is loaded by the determination of the direction of the change of the inclination angle as a function of the increase or decrease in the error rate or in the level of the HF signal. In order to exclude from the inclination control process those factors which, in addition to the inclination of the scanning beam, influence the detected radio-frequency signal, additional inclination sensors have also already been used for inclination control, but these involve additional complexity.

SUMMARY OF THE INVENTION

The object of the invention is to provide a method and an arrangement for a replay or recording appliance for optical recording media having an inclination control system which very largely overcome the disadvantages which have been mentioned, and which can be implemented with little complexity, and nonetheless without any additional inclination sensors.

This object is achieved by the features specified in the independent claims. Advantageous refinements are specified in dependent claims.

One aspect of the invention is to align the scanning beam in a replay or recording appliance for optical recording media at right angles to the recording medium without any additional inclination sensors and very largely uninfluenced by other factors which, in addition to the inclination of the scanning beam, influence the detected radio-frequency signal. The scanning beam, which is intended for recording or replaying information, is slaved to the discrepancies between the recording medium and a plane by means of an inclination control system, or the scanning device which produces the scanning beam is aligned at right angles to the recording medium in the event of any tilt or inclination. The alignment of the scanning device at right angles to the recording medium by means of an inclination control system has the advantage, in addition to improved recording or replay, that the adjustment process for the scanning device during the production of the recording or replay appliance can be carried out with less accuracy. While the aim of the invention is likewise to detect as high a radio-frequency signal as possible from the recording medium by alignment of the scanning beam at right angles to the recording medium, other factors which, in addition to the inclination of the scanning beam, influence the amplitude and/or the level of the radio-frequency signal should, however, very largely be excluded from the control of the inclination of the scanning beam. A further aim is to avoid additional inclination sensors and a control process based on the so-called trial and error principle.

An inclination control system is therefore provided which is based on a lower envelope curve signal or the mirror signal of a radio-frequency signal which is detected from the recording medium and which corresponds to the dark value of a radio-frequency signal which is detected from the optical recording medium. The lower envelope curve signal or the mirror signal is multiplied by a modulation signal and is integrated in order to form a control error which corresponds to the inclination of the scanning beam with respect to the optical recording medium. The modulation signal, which is likewise added to the signal for controlling the means for adjustment of the inclination of the scanning beam which is directed at the recording medium, is, according to one exemplary embodiment, a square-wave signal with a polarity that changes after a zero signal phase or pause. The amplitude of the modulation signal was, in one embodiment, chosen such that it results in the inclination of the scanning beam being changed by approximately $\frac{1}{30}$ degree or 2 minutes of arc. On the basis of the exemplary embodiment, a symmetrical square-wave signal at a frequency of 4 Hz, with the stated amplitude and having a 50% zero component is used as the modulation signal. However, in principle, other signal forms, such as a sinusoidal, triangular waveform or sawtooth waveform signal may also be used as the modulation signal. With regard to the frequency, a modulation signal with a period duration which corresponds at least to one revolution of the recording medium is advantageous, although it is also possible to use other frequencies which take account of the requirements for the speed of the inclination control system.

Since the lower envelope curve signal or the dark value of the radio-frequency signal which is detected from the recording medium is used for inclination control, this prevents other factors which likewise influence the amplitude and/or the level of the radio-frequency signal which is detected from the recording medium from disadvantageously influencing the inclination control system. The modulation signal which is used for inclination control is chosen such that it is virtually undetectable in the radio-frequency signal which is detected from the recording medium. Since the inclination angle varies relatively slowly during the scanning of the recording medium, a low modulation signal frequency is sufficient for inclination control. The lower envelope curve signal is multiplied by the modulation signal and is then integrated in order to directly determine a control error which represents the error in the alignment of the scanning beam at right angles to the recording medium, thus resulting in dynamic and immediately effective inclination control.

Already existing assemblies can advantageously be used in such appliances in order to implement the method in a recording or replay appliance. By way of example, a so-called mirror signal detector is already provided in appliances such as these for detection of track changes, and this produces the lower envelope curve signal that is referred to as the mirror signal. The mirror signal, which is normally used only with an open track control loop when the scanning beam leaves the recording track, is in this case used for inclination control in a closed track control loop. A multiplier, a modulator and an inclination controller are provided in order to produce the inclination angle control loop, so that the circuit arrangement which may, for example, be in the form of a digital circuit arrangement involves little complexity. The signal from the lower envelope curve which is produced by an envelope curve detector or a wobble signal detector is supplied to a multiplier, which is connected to the modulator in order to produce the modulation signal. Multiplication of the envelope curve signal by the modulation signal results in the correlation of the envelope curve signal with the modulation signal, so that integration of the signal over at least one period duration results in a control error which corresponds to the inclination and is supplied to an inclination controller, which is connected to the multiplier and whose output is connected to the modulator and to a means for adjustment of the inclination of the scanning beam. The output signal from the inclination controller is used in the actuator in order to drive a coil for the inclination of the scanning beam, which coil is comparable with the coils for tracking or focusing and has a comparable transfer function, thus allowing fast inclination angle changes in the range above 100 Hz. The A/D- and D/A-converters which are provided in recording or replay appliances for optical recording media with digital servo control loops, in order to control the scanning device and for digitization by means of the signals which are detected from the recording device may likewise be used for the inclination control loop, since the signal frequency is low. Known 3D actuators may be used for alignment of the scanning beam at right angles to the recording medium, with 3D actuators such as these aligning the inclination angle of the scanning beam with respect to the recording medium by means of coils or a motor.

Although the recording media which are used in recording appliances generally do not yet contain any recorded information to form the radio-frequency signal in replay appliances, the method and the arrangement can be used both in recording appliances and in replay appliances since recording media such as these have a wobble track for recording of information, which likewise produces a radio-frequency signal which is detected by a wobble signal detector.

The proposed inclination control loop does not require any additional processor power, so that the central processor unit in the appliance is not loaded by decisions on the direction of the inclination angle change.

BRIEF DESCRIPTION OF PREFERRED EMBODIMENTS

The invention will be explained in more detail in the following text with reference to exemplary embodiments in the drawings, in which.

DETAILED DESCRIPTION OF PREFERRED EMBODIMENTS

Reference symbols are used in a matching manner in the figures.

Figure 1:
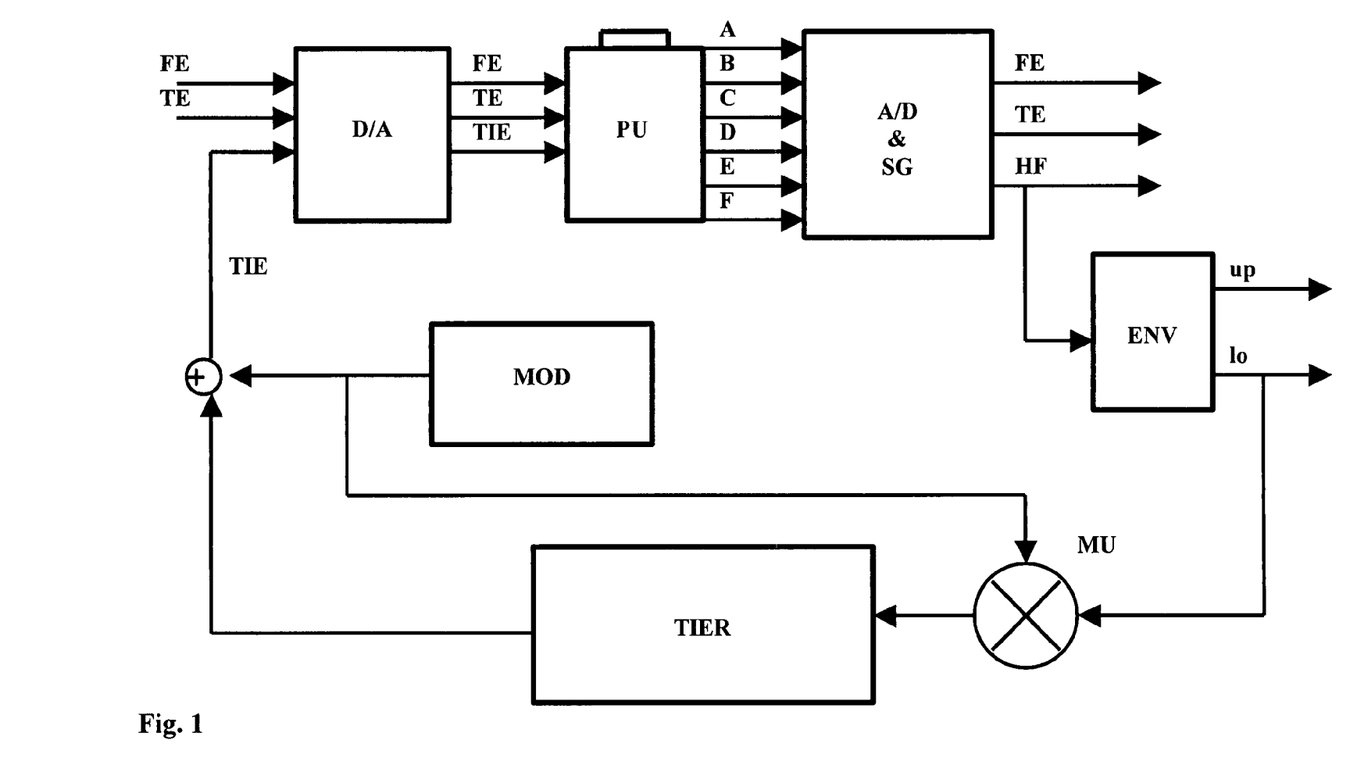
FIG. 1 shows a block diagram of a circuit arrangement for inclination control in a replay appliance for optical recording media.
Figure 2:
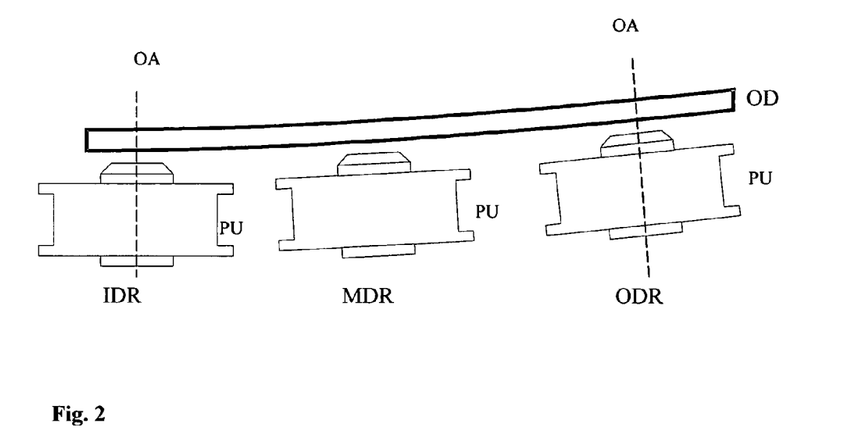
FIG. 2 shows an outline sketch relating to the alignment of the scanning beam for a recording medium which is curved upwards.
Figure 3:
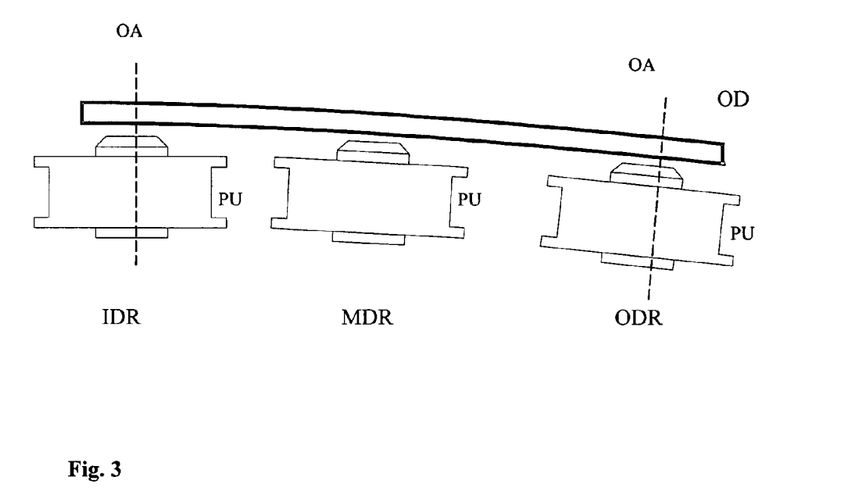
FIG. 3 shows an outline sketch relating to the alignment of the scanning beam for a recording medium which is curved downwards.
Figure 4:
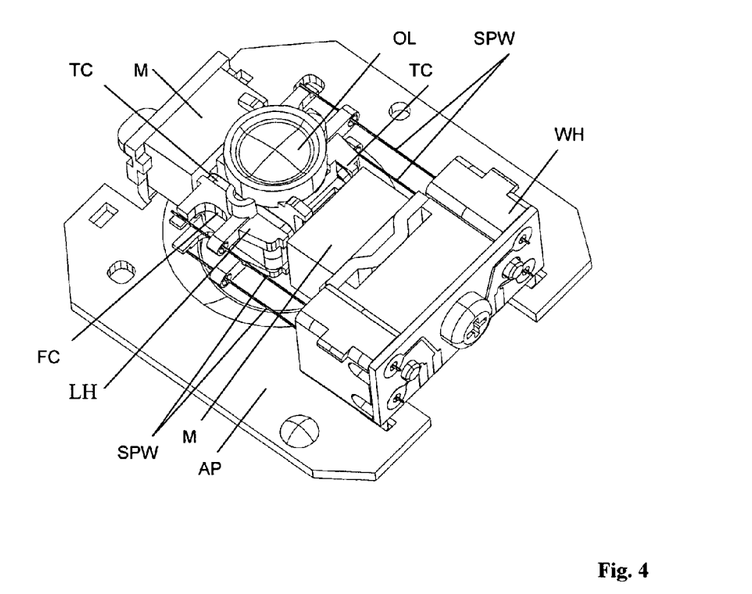
FIG. 4 shows an outline sketch relating to the configuration of a known optical scanning device.
Figure 5:
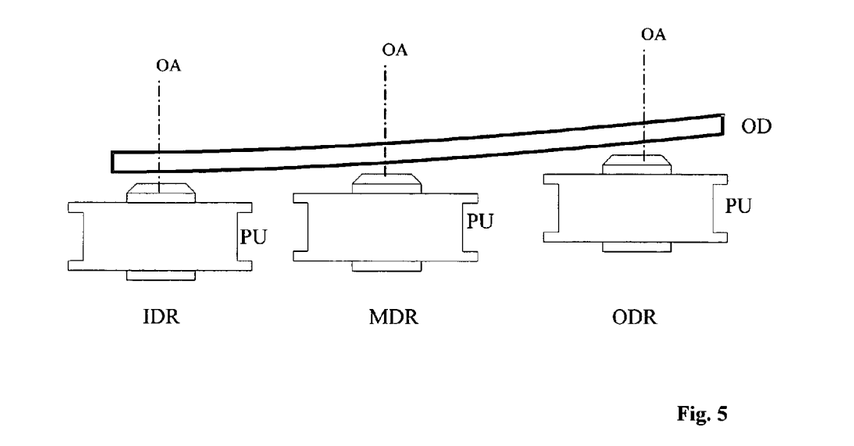
FIG. 5 shows an outline sketch relating to the alignment of the scanning beam with a known optical scanning device.
Figure 6:
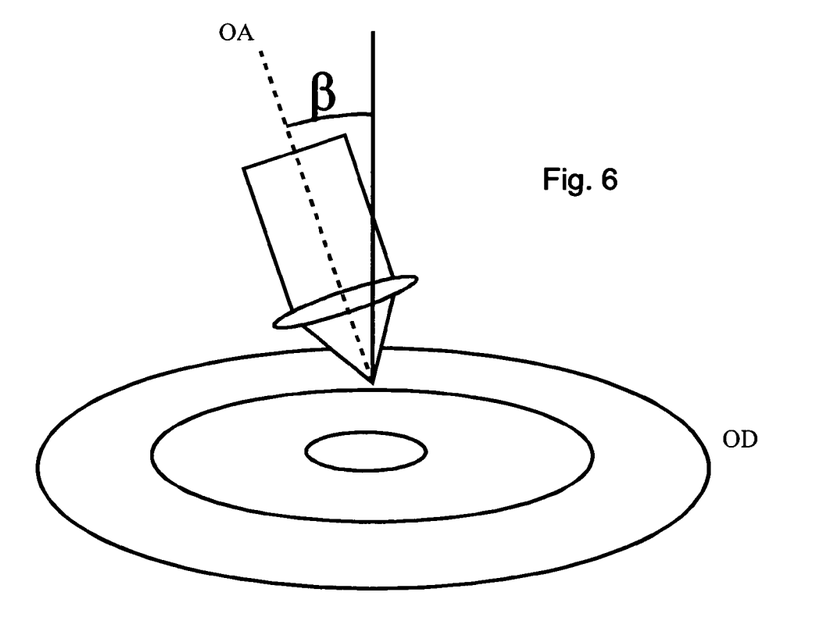
FIG. 6 shows an outline sketch relating to the tangential inclination of the scanning beam with respect to the recording medium.
Figure 7:
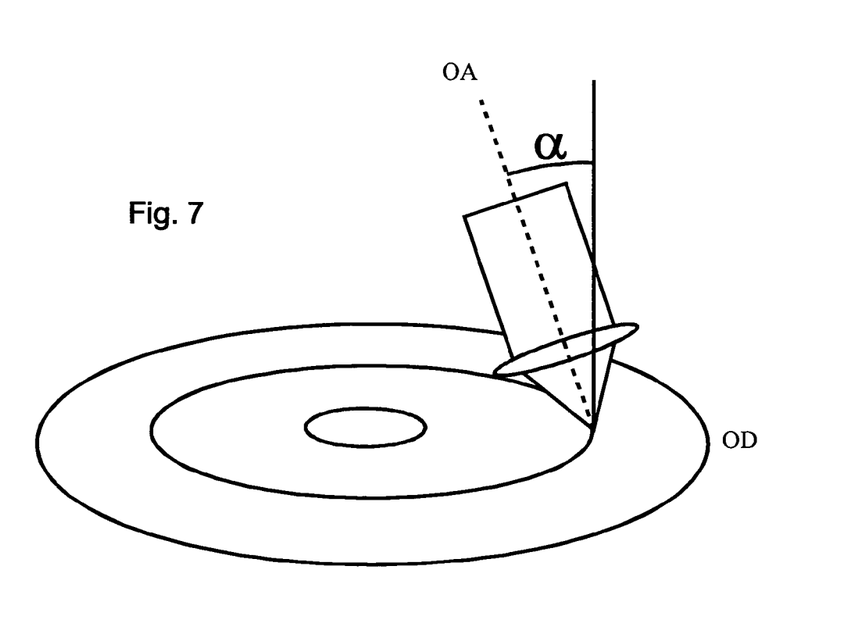
FIG. 7 shows an outline sketch relating to the radial inclination of the scanning beam with respect to the recording medium.
Figure 9:
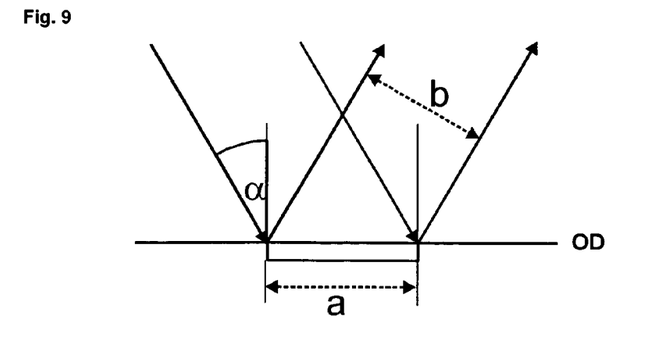
FIG. 9 shows an outline sketch in order to illustrate scanning beam inclination.
Figure 10:
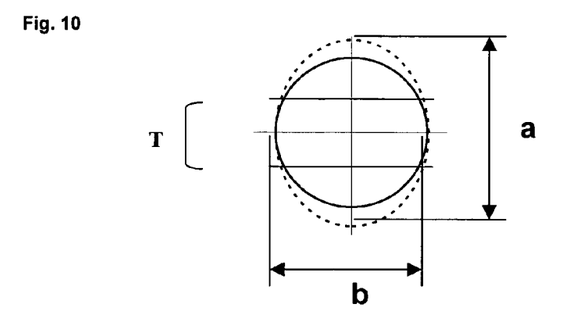
FIG. 10 shows an outline sketch relating to the scanning change with the inclination of the scanning beam.
Figure 11:
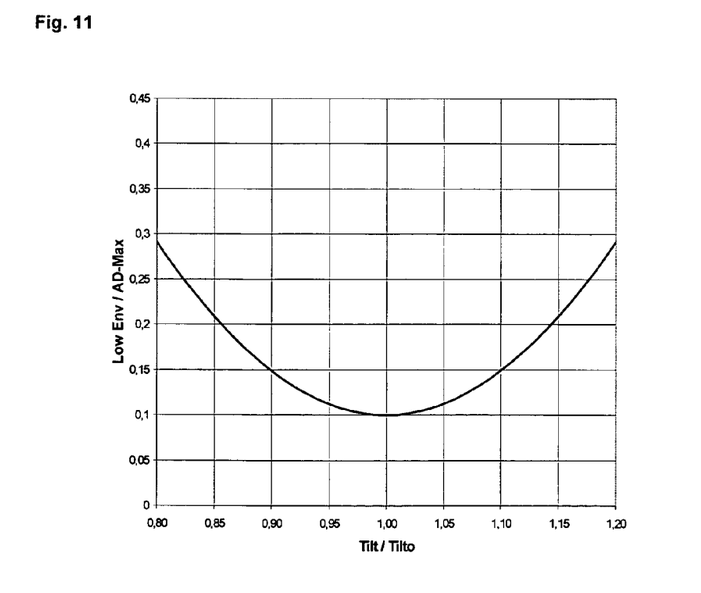
FIG. 11 shows a diagram of the relationship between the lower envelope curve and the inclination of the scanning beam.
Figure 12:
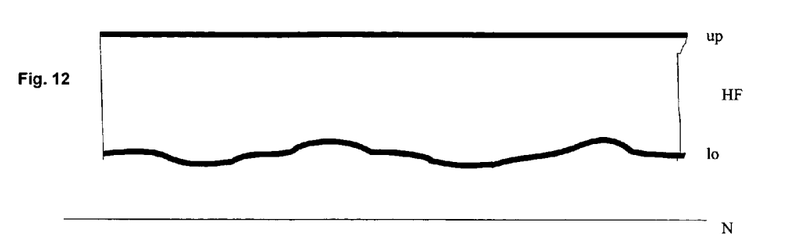
FIG. 12 shows an outline sketch in order to illustrate the radio-frequency signal for a large inclination.
Figure 13:
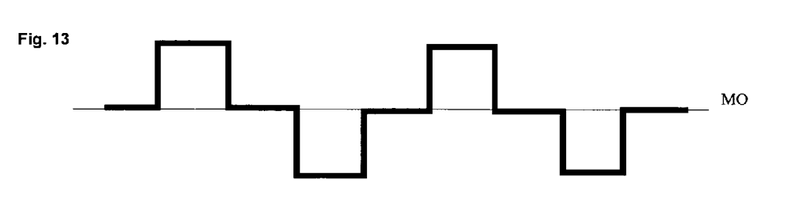
FIG. 13 shows a modulation signal.
Figure 14:
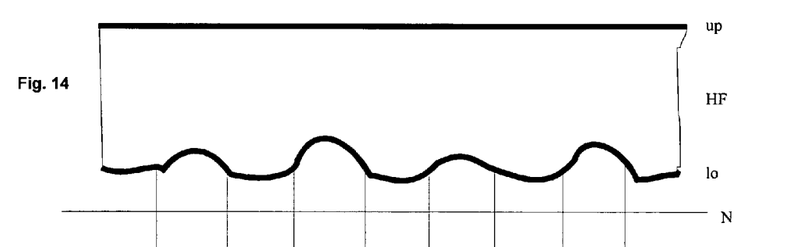
FIG. 14 shows an outline sketch in order to illustrate the radio-frequency signal with reduced inclination.
Figure 15:
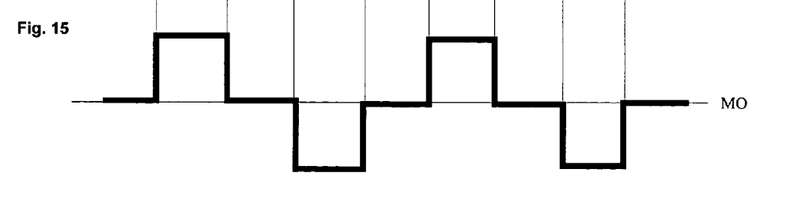
FIG. 15 shows a modulation signal.
Figure 16:
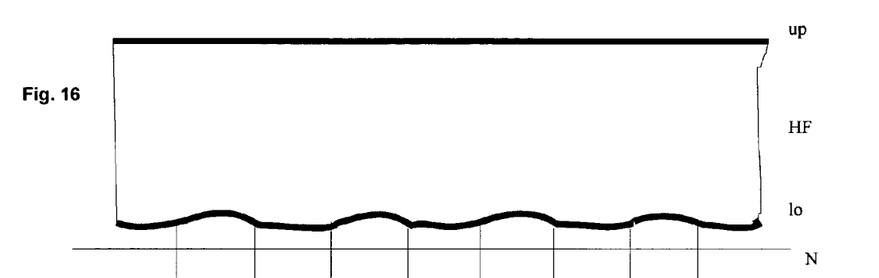
FIG. 16 shows an outline sketch in order to illustrate the radio-frequency signal when the scanning beam is aligned at right angles.
Figure 17:
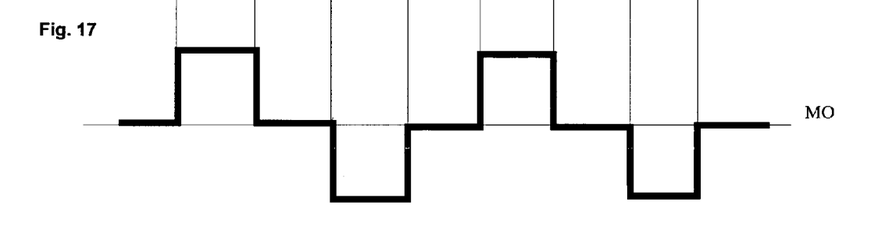
FIG. 17 shows a modulation signal.

Recording or replay appliances for optical recording media have a scanning device PU which is used to scan an optical recording medium OD that is not illustrated in FIG. 1. The scanning device PU is driven in a known manner by a track error signal TE and a focus error signal FE for tracking and focusing the scanning beam on the optical recording medium OD. The light which is reflected from the optical recording medium OD is detected by means of photodetectors A to F and is supplied in digital servo control loops via at least one analog/digital converter A/D and/or signal production means SG to the controllers for controlling the tracking and for focusing. Furthermore, the scanning device PU produces a radio-frequency signal HF which is detected from the optical recording medium OD and corresponds to the light intensity. The reproduced information signal is formed by high-pass filtering of the HF signal. The radio-frequency signal HF is also supplied in a known manner to an envelope curve detector ENV, which produces the upper envelope curve signal up, which corresponds to the intensity of so-called lands, and the lower envelope curve signal lo of the radio-frequency signal HF. The lower envelope curve signal corresponds to the intensity of the pits. These envelope curve signals up, lo are generally produced in recording or replay appliances for optical recording media OD in order, for example, to make it possible to evaluate track changes or disturbances on the optical recording medium OD with high reliability. The lower envelope curve signal lo is also referred to as the mirror signal and, in the case of an open track control loop, is generally used for signaling track changes. The expressions mirror and mirror signal are thus based on the scanning beam crossing over the mirror surface of the optical recording medium OD during a track change. The upper envelope curve signal up and the lower envelope curve signal lo which are produced from the radio-frequency signal HF by the envelope curve detector ENV are illustrated in FIGS. 12, 14, 16. FIGS. 12, 14, 16 show radio-frequency signals HF with a different level or different amplitude, which is influenced by the inclination of the scanning beam with respect to the optical recording medium OD. With regard to the inclination of the scanning beam with respect to the optical recording medium OD, a fundamental distinction is drawn between a radial inclination and a tangential inclination, as is illustrated in FIGS. 6 and 7. FIG. 6 shows the tangential inclination of a scanning beam with respect to the recording track on the optical recording medium OD, where the inclination angle $\beta$ of the scanning beam with respect to a perpendicular to the optical recording medium OD is the tangential inclination angle $\beta$. While a tangential inclination angle $\beta$ leads to the pits on the optical recording medium OD possibly being read with a different length, a radial inclination angle $\alpha$ leads to a reduced level or reduced amplitude of the radio-frequency signal HF which is scanned from the optical recording medium OD. The level or the amplitude of the radio-frequency signal HF is reduced because the inclination of the scanning beam with respect to a perpendicular to the optical recording medium OD leads to a broader scanning light spot. If the beam is assumed to be circular, then an elliptical area is reflected if there is any inclination. When the beam is over a land, then the elliptical area corresponds completely to the mirror area, and the intensity of the scanning beam is relatively independent of the inclination. When the beam is over a pit, then the intensity is changed since an optimum pit intensity or an optimum dark value by cancellation is achieved only when the incident radiation is at right angles. The scanning beam is focused on the optical recording medium by means of a focus control loop so that, as is illustrated in FIG. 10, a circular light spot with a predetermined diameter is formed on the information track T on the optical recording medium OD when aligned at right angles to the optical recording medium OD. The light which is reflected from the optical recording medium OD is detected by means of the scanning device PU, which has a known configuration photodetector (which comprises four quadrants A, B, C, D) for the main beam and two secondary beam detectors E, F. The signals from the secondary beam detectors E, F are generally used to form the track error signal TE for CD recording media OD, while the difference signal between the sum of opposite quadrants of the main beam detector is used to form the focus error signal FE, and the sum signal of the quadrants A, B, C, D is used to form the information signal or the radio-frequency signal HF. The focus control loop for a scanning device PU such as this controls the objective lens of the scanning device PU to a position such that a circular light spot is always formed on the photodetector. A scanning beam which is directed at the optical recording medium OD at an inclination angle $\alpha$ and is reflected and detected, as is illustrated in FIG. 9, with a width b illuminates an area with an extent a, however, on the optical recording medium OD. This extent a resulting from a radial inclination angle $\alpha$ leads to a broader scanning light spot, which has the extent a with respect to the information track width T of the optical recording medium OD. The scanning of optical recording media OD with information storage elements which are formed by depressions or projections, the so-called pits or the so-called trenches in the case of writeable optical recording media OD is, however, based on the principle of destructive interference, so that a predetermined relationship must be maintained between a projection and a depression which are illuminated at the same time in order to cancel out the scanning beam which is reflected from the recording medium OD. This relationship is disturbed if the scanning light spot has an extent a with respect to the information track width T of the optical recording medium OD. The proportion of the light which is reflected from the mirror surface that is located between the information tracks is greater than the proportion which is reflected from the depression or from the information track. Since the depression which forms the information track on the recording medium OD is chosen so as to produce a phase shift which leads to the cancellation of the scanning beam, a broader scanning light spot from the recording medium OD results in a lower dark value being detected. The maximum value of the light which is reflected from the recording medium OD between the tracks of the recording medium OD or away from the depressions in contrast remains constant. The change between depressions and projections on the information carrier layer of the recording medium OD is detected by the scanning device PU as the radio-frequency signal HF. The reduction in the cancellation of the scanning beam which is reflected from the recording medium then leads to the radio-frequency signal HF having a lower level or a lower amplitude since the difference between the maximum value and the minimum value of the radio-frequency signal HF is referred to as the level or amplitude of the radio-frequency signal HF. The maximum values of the radio-frequency signal HF form the upper envelope curve signal up, and the minimum values of the radio-frequency signal HF form the lower envelope curve signal lo of the radio-frequency signal HF. Since the lower envelope curve signal lo represents the dark value of the signal which is detected from the recording medium OD, the ratio of the lower envelope curve Low Env to a maximum value AD-Max which is detected from the quadrants A . . . D of the photodetector of the scanning device PU is at a minimum when the scanning beam is aligned at right angles to the recording medium OD, as is illustrated in FIG. 11. The ratio of the error Tilt from an alignment of the scanning beam at right angles to the recording medium OD with respect to the alignment without any error Tilto is used as the abscissa for the graph in FIG. 11. FIG. 11 thus shows the relationship between the lower envelope curve or the lower envelope curve signal lo and the radial inclination of the scanning beam with respect to the recording medium OD. In order to achieve the radio-frequency signal HF whose amplitude is as high as possible or which is at the maximum level, the scanning beam and the optical axis OA of the scanning device PU must always be aligned at right angles to the optical recording medium OD even when the optical recording media OD are curved, as is illustrated in FIGS. 2 and 3. The curvature of the recording media OD generally increases from an inner radius IDR via a middle radius MDR to an outer radius ODR, and the optical recording medium OD may be curved upwards, as is illustrated in FIG. 2, or downwards, as is illustrated in FIG. 3. Furthermore, it is also possible for the optical recording medium OD to be curved upwards as far as a specific radius, and then to be curved downwards, or vice versa. However, the smallest curvature generally occurs at the inner radius IDR of the optical recording medium OD. The tilting of the optical axis OA with respect to the alignment at right angles to the optical recording medium OD was originally neither intended nor required for low storage density optical recording media OD such as CDs, so that a scanning device PU as illustrated by way of example in FIG. 4 was adequate. An optical scanning device PU as is illustrated in FIG. 4 comprises an objective lens OL which is mounted on a lens holder LH which is elastically supported on a wire holder VW via four wires SPW. The wire holder WH is mounted on a base plate AP, which is also fitted with magnets M. A focus coil FC and tracking coils TC are provided on the lens holder LH and are driven via the wires SPW in order to deflect the objective lens in the track and/or focus direction. The laser and the photodetectors for production and detection of the scanning beam, respectively, are arranged, in a manner which is not illustrated, underneath the lens holder LH. The scanning device PU is generally arranged on a coarse drive in order to make it possible to scan the optical recording medium OD over the entire area of the information carrier layer. As is illustrated in FIG. 5, scanning devices PU such as these do not take account of any curvature of the optical recording medium OD. The optical axis OA of the scanning device PU was aligned at right angles to a planar recording medium OD during the production process, and this alignment of the optical axis OA is also retained during the scanning of curved recording media OD by means of the parallel guidance that is formed by the wires SPW. In order to ensure that the optical axis OA is always aligned at right angles to the recording medium OD even in the case of curved recording media OD, as is illustrated in FIG. 2 and FIG. 3, scanning devices PU are already known in which the optical axis OA is matched to the curvature of the optical recording medium by tilting the scanning device PU, as is illustrated in FIG. 4, by means of a motor or by tilting the objective lens OL. Additional coils are then provided in order to tilt the objective lens OL, by means of which coils the lens holder LH and the objective lens OL are additionally inclined for deflection in the focus and track direction. Independently of the means for inclination of the optical axis OA of the scanning device PU, a control loop is provided by means of which the optical axis OA is appropriately slaved to the curvature of the optical recording medium OD in order to always ensure that the scanning beam is aligned at right angles to the optical recording medium OD despite the curvature of the recording medium OD or if the scanning device PU is positioned obliquely when it is in the neutral position. In order to avoid the disadvantages of known control loops for inclination control, a control loop is provided which makes use of an envelope curve which represents the dark value of a radio-frequency signal HF that is scanned from the optical recording medium OD. When considered in the normal manner, this envelope curve is the lower envelope curve signal lo of the radio-frequency signal HF which is detected from the information track on the optical recording medium OD. The lower envelope curve signal lo, as is illustrated in FIG. 12, is relatively far away from a zero line N if the scanning beam has an inclination which needs to be corrected with respect to the recording medium OD, and is relatively close to the upper envelope curve up of the radio-frequency signal HF. The level or the amplitude of the detected radio-frequency signal HF which is required in order to replay the information that is stored on the recording medium OD is less than that when the scanning beam is aligned at right angles, as is shown by a comparison of FIGS. 12 and 16. The inclination of the scanning beam is corrected by use of a modulation signal MO, which is illustrated on a larger scale in FIGS. 13, 15 and 17 in order to illustrate the principle. On the basis of an exemplary embodiment, a modulation signal MO is used which is a symmetrical square-wave signal with a 50% zero component and at a frequency of 4 Hz. A symmetrical square-wave signal with a 50% zero component in this case describes a signal in which square-wave pulses of different polarity alternate separated by a zero signal, which is in each case of equal length, during one period. However, in principle, other signal forms which are preferably symmetrical with respect to a zero line and are at a different frequency may also be used as the modulation signal MO. The lower envelope curve signal lo is on the one hand multiplied by the modulation signal MO and is on the other hand added to the control signal in order to vary the inclination of the scanning beam with respect to the recording medium OD. Addition of the modulation signal MO to the control signal which is provided for variation of the inclination of the scanning beam influences the lower envelope curve signal lo in a manner which will be described in order to explain the principle in FIG. 14. However, the description is purely theoretical since the modulation is scarcely detectable when the radio-frequency signal HF is viewed on an oscilloscope. On the basis of an exemplary embodiment, a modulation signal MO was used with an amplitude which corresponds to a change of about $\frac{1}{30}$ degree of the scanning beam or 2 minutes of arc in the inclination of the optical axis OA of the scanning beam. The modulation signal MO, which is illustrated enlarged for illustrative purposes in FIG. 15, analogously to FIG. 13, leads in the lower envelope curve lo (which is likewise illustrated enlarged in FIG. 14) of the radio-frequency signal HF to a lower dark value being achieved for a deflection which goes beyond the alignment at right angles. Although a symmetrical modulation signal MO is used, the effects in the lower envelope curve lo of the radio-frequency signal HF remain asymmetric or unequal, however, for as long as the scanning beam is inclined or is not at right angles. Owing to the correlation with the modulation signal MO, the lower envelope curve signal lo has an asymmetry which is used to control the inclination of the scanning beam. For this purpose, the lower envelope curve signal lo is multiplied by the modulation signal MO upstream of the inclination controller TIER to which the control error is supplied. When the scanning beam is aligned at right angles to the recording medium OD, this leads, as is illustrated in FIG. 16, to the radio-frequency signal HF having its maximum level at maximum amplitude, since maximum cancellation is achieved, and hence the lowest value of the lower envelope curve signal lo. For illustrative purposes, FIG. 16 also shows modulation of the lower envelope curve signal although, in practice, this is no longer perceptible. Both the positive and the negative amplitude of the modulation signal MO lead to a lower dark value which is the same for both directions of the modulation signal MO when the scanning beam is aligned at right angles to the recording medium OD, so that the control error is zero. A scanning beam inclination other than 90 degrees asymmetrically modulates the modulation signal MO which is added via the adder + to the control signal in order to adjust the inclination of the scanning beam, so that a control error can be detected even after integration over one period of the modulation signal MO.

Since the lower envelope curve signal lo is used for inclination control, other factors which likewise have a disadvantageous effect on the level or the amplitude of the radio-frequency signal HF are excluded from the inclination control process, thus avoiding the disadvantages of known solutions. Scratches, fingerprints or other dirt, defects or disturbances on the surface generally reduce the reflection level on the optical recording medium, thus in particular influencing the upper envelope curve signal up and the level or the amplitude of the radio-frequency signal HF. Furthermore, such dirt, defects or disturbances on the optical recording medium OD also result in an increased error rate in the detected information signal. Since factors such as these influence the radio-frequency signal HF independently of the inclination of the scanning beam, their influence is excluded from the inclination control process by use of the lower envelope curve signal lo, which represents the dark value of the detected radio-frequency signal HF. There is no need for any additional inclination sensor for inclination control and, nevertheless, other factors which influence the radio-frequency signal HF independently of the inclination of the scanning beam are very largely prevented from having any influence on the inclination control.

Figure 8:
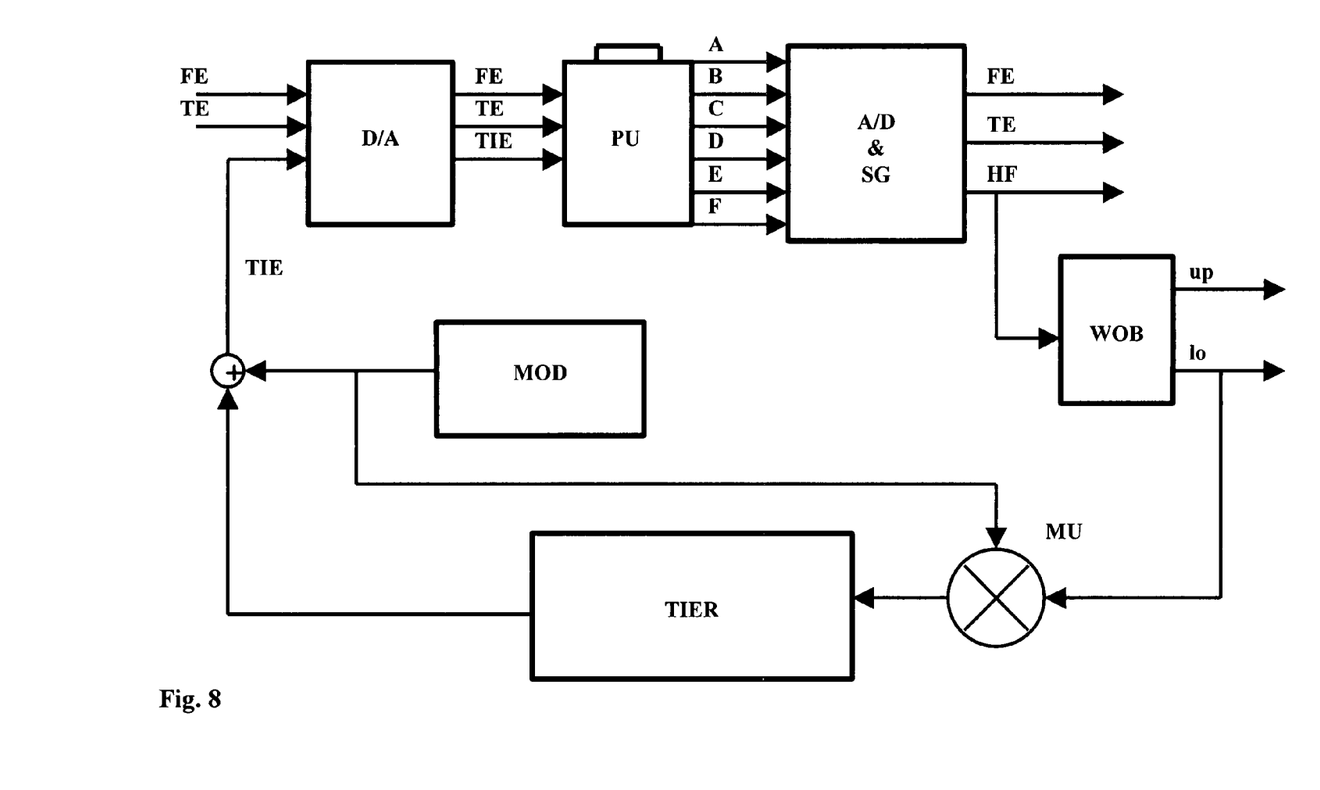
FIG. 8 shows a block diagram of a circuit arrangement for inclination control in a recording appliance for optical recording media.

The envelope curve signals lo, up can be produced both by capacitive coupling and by DC coupling from the radio-frequency signal HF, with the DC connection of the envelope curve detector ENV to the photodetectors having been found to be advantageous. Furthermore, the inclination control loop may, as is illustrated in FIG. 1, be in the form of a digital control loop, using assemblies which are already available in the recording or replay appliance. In the case of replay appliances for optical recording media, the radio-frequency sum signal from the photodetectors A, B, C, D is used, after high-pass filtering, as the information signal, which is also referred to as the so-called reproduced signal, with the abbreviation RF. However, the reproduced signal loses the characteristics which are used by the radio-frequency signal HF to form the envelope curve signals lo, up. Optical recording media OD on which no information signals are yet stored have information written to them in recording appliances. However, recording media OD such as these already have a so-called trench in the form of a wobble track even before they are recorded, and this is used for the recording of information. The wobble track on the optical recording medium OD, which is also used for determining the location on the recording medium OD, is likewise detected by the scanning device PU and, analogously to optical recording media OD which already have recorded information, supplies a radio-frequency signal HF which is referred to as the wobble signal WOB. The lower envelope curve of the wobble signal WOB is then used for inclination control in recording appliances for optical recording media OD. The corresponding circuit arrangement for implementation of the method is illustrated in FIG. 8. FIG. 8 differs from FIG. 1 only in that the envelope curve detector ENV is replaced by a wobble signal detector WOB. The lower envelope curve signal lo of the wobble signal WOB likewise represents the dark value of the radio-frequency signal HF or of the wobble signal WOB, so that the method and the arrangement can be used in the same way for recording and replay appliances. The lower envelope curve signal lo of a radio-frequency signal HF which is detected from the optical recording medium OD is multiplied by a modulation signal MO and is integrated or low-pass filtered in order to form a control error, which corresponds to a discrepancy between the scanning beam, which is directed at the optical recording medium OD, and the perpendicular. As is shown in FIG. 1, the inclination control loop is formed from a multiplier MU, a modulator MOD and an inclination controller TIER, so that the circuit arrangement involves little complexity. The modulator MOD is connected to the multiplier MU and to an adder+, which is connected to the output of the inclination controller TIER, and the multiplier MU, to which the lower envelope curve signal lo is also supplied, is connected to the input of the inclination controller TIER, whose output, as is illustrated in FIG. 1, is connected via a digital/analog converter D/A to the scanning device PU, which has a means for adjusting the inclination of the scanning beam.

The embodiments described here are cited as examples, and a person skilled in the art will be able to produce other embodiments of the invention, which remain within the scope of the invention.

What is claimed is:

1. A method for a replay or recording appliance for an optical recording medium having an inclination control system providing an inclination signal for a scanning beam, wherein a lower envelope curve signal of a radio-frequency signal which is detected by the optical recording medium and represents a dark value of the detected radio-frequency signal is multiplied by a modulation signal and added to the inclination signal for inclination control.

2. The method as claimed in claim 1, wherein the radio-frequency signal is a radio-frequency signal which is detected by an information track of the optical recording medium and, after high-pass filtering, is used as a reproduced information signal.

3. The method as claimed in claim 1, wherein the radio-frequency signal is a wobble signal, which is detected by the optical recording medium.

4. The method as claimed in claim 1, wherein the lower envelope curve signal is a mirror signal, which is produced by an envelope curve detector.

5. The method as claimed in claim 1, wherein the lower envelope curve signal is multiplied upstream of the inclination control system by the modulation signal which is added to an output signal from the inclination control system for alignment of the scanning beam at right angles to the optical recording medium.

6. A method for a replay or recording appliance for an optical recording medium having an inclination control system for a scanning beam, wherein a lower envelope curve signal of a radio-frequency signal which is detected by the optical recording medium and represents a dark value of the detected radio-frequency signal is used for inclination control, wherein a symmetrical square-wave signal with a 50% zero signal component is used as the modulation signal.

7. The method as claimed in claim 1, wherein the lower envelope curve signal is integrated or low-pass filtered in order to form a control error which corresponds to any error between a scanning beam which is directed at the optical recording medium and the vertical.

8. An arrangement for a replay or recording appliance for optical recording media having an inclination control system for the scanning beam, wherein the input of an inclination control system is connected to a multiplier whose inputs are connected to a connection which produces the lower envelope curve signal of a radio-frequency signal which is detected by the optical recording medium, and are connected to a modulator which is connected to the output of the inclination control system, which is connected to a means for varying the inclination of a scanning beam which is directed at the optical recording medium.

9. The arrangement as claimed in claim 8, wherein the connection of the modulator to the output of the inclination control system is an adder.

10. The arrangement as claimed in claim 8, wherein the connection, which produces the lower envelope curve signal of a radio-frequency signal, which is detected by the optical recording medium, is an envelope curve detector.

11. The method as claimed in claim 1, wherein the lower envelope curve signal is multiplied at upstream of the inclination control system by the modulation signal which is added to an output signal from the inclination control system.

12. The method as claimed in claim 1, wherein the inclination control system aligns the scanning beam at right angles to the optical recording medium.

* * * * *